US012094188B2

(12) United States Patent
Li et al.

(10) Patent No.: US 12,094,188 B2
(45) Date of Patent: Sep. 17, 2024

(54) METHODS AND SYSTEMS FOR TRAINING LEARNING NETWORK FOR MEDICAL IMAGE ANALYSIS

(71) Applicant: Shenzhen Keya Medical Technology Corporation, Shenzhen (CN)

(72) Inventors: Junhuan Li, Shenzhen (CN); Ruoping Li, Shenzhen (CN); Ling Hou, Shenzhen (CN); Pengfei Zhao, Shenzhen (CN); Yuwei Li, Bellevue, WA (US); Kunlin Cao, Kenmore, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 405 days.

(21) Appl. No.: 17/565,274

(22) Filed: Dec. 29, 2021

(65) Prior Publication Data
US 2022/0366679 A1    Nov. 17, 2022

(30) Foreign Application Priority Data
May 13, 2021 (CN) .......................... 202110525922.4

(51) Int. Cl.
*G06V 10/774* (2022.01)
*G06T 7/00* (2017.01)
(Continued)

(52) U.S. Cl.
CPC ........ *G06V 10/7747* (2022.01); *G06T 7/0012* (2013.01); *G06V 10/776* (2022.01);
(Continued)

(58) Field of Classification Search
None
See application file for complete search history.

(56) References Cited

U.S. PATENT DOCUMENTS

| 2018/0144214 A1* | 5/2018 | Hsieh | G06T 7/0002 |
| 2022/0284301 A1* | 9/2022 | Qiu | G06N 3/084 |

FOREIGN PATENT DOCUMENTS

| CN | 109949304 A | 6/2019 |
| CN | 110664426 A | 1/2020 |

(Continued)

OTHER PUBLICATIONS

First Office Action in corresponding Chinese Application No. 202110525922.4 dated Jul. 6, 2021 (10 pages).
(Continued)

*Primary Examiner* — Leon Flores
(74) *Attorney, Agent, or Firm* — Bayes PLLC

(57) ABSTRACT

The present disclosure relates to a training method and a training system for training a learning network for medical image analysis. The training method includes: acquiring an original training data set for a learning network with a predetermined structure; performing, by a processor, a pre-training on the learning network using the original training data set to obtain a pre-trained learning network; evaluating, by the processor, the pre-trained learning network to determine whether the pre-trained learning network has an evaluation defect; when the pre-trained learning network has the evaluation defect, performing, by the processor, a data augmentation on the original training data set for the existing evaluation defect; and performing, by the processor, a refined training on the pre-trained learning network using a data augmented training data set. The present disclosure can evaluate and train the learning network in stages, therefore, the complexity of medical image processing is reduced, and the efficiency and accuracy of medical image analysis are improved.

20 Claims, 8 Drawing Sheets

(51) Int. Cl.
*G06V 10/776* (2022.01)
*G06V 10/82* (2022.01)

(52) U.S. Cl.
CPC .... *G06V 10/82* (2022.01); *G06T 2207/10081* (2013.01); *G06T 2207/30048* (2013.01)

(56) References Cited

FOREIGN PATENT DOCUMENTS

| | | | |
|---|---|---|---|
| CN | 110689038 | A | 1/2020 |
| CN | 110689089 | A | 1/2020 |
| CN | 110874604 | A | 3/2020 |
| CN | 111008959 | A | 4/2020 |
| CN | 111126794 | A | 5/2020 |
| CN | 111427995 | A | 7/2020 |
| CN | 111758105 | A | 10/2020 |
| CN | 111857793 | A | 10/2020 |
| CN | 112150510 | A | 12/2020 |
| CN | 112215807 | A | 1/2021 |
| CN | 112270376 | A | 1/2021 |
| CN | 112541555 | A | 3/2021 |

OTHER PUBLICATIONS

Second Office Action in corresponding Chinese Application No. 202110525922.4 dated Aug. 12, 2021 (8 pages).
Final Office Action in corresponding Chinese Application No. 202110525922.4 dated Sep. 8, 2021 (8 pages).

\* cited by examiner

METHODS AND SYSTEMS FOR TRAINING LEARNING NETWORK FOR MEDICAL IMAGE ANALYSIS

CROSS REFERENCE TO RELATED APPLICATIONS

The application is based upon and claims the benefit of priority to Chinese Patent Application No. 202110525922.4, filed May 13, 2021, the entire content of which is incorporated herein by reference.

TECHNICAL FIELD

The present disclosure relates to the technical field of medical image analysis, and more particularly, to a training method, a training system and a training method of a learning network for medical image analysis, and a computer-readable storage medium.

BACKGROUND

Structural and functional imaging of human internal tissues can be performed quickly, non-invasively or minimally invasively, thus assisting understanding of the physiological structure and metabolic situation of human organs. At present, medical image analysis has become an indispensable tool of clinical diagnosis. Using image processing technology and computer technology, this information can be effectively processed for computer-aided diagnosis and surgical planning, etc., which has great social benefits and broad applications.

In recent years, Deep Learning (DL) has rapidly developed into a research hotspot of medical image analysis, which can automatically extract hidden disease diagnosis features from medical image big data, and has gradually become an important technology in image screening and classification.

However, it usually takes a long time to accumulate a requisite amount of medical image data, and the demand of deep learning algorithm for high-quality data makes it more difficult to collect data suitable for training. Therefore, when using medical data for model training, data on some specific areas or containing specific lesions are insufficient. In addition, the noise and artifacts contained in the medical images not only affect the quality of medical images, but also affect the deep learning ability of the model. Therefore, due to the particularity of medical data and the limitations of deep learning, the existing deep learning model training methods cannot meet the needs of clinical applications that require accurate analysis and diagnosis of disease. The existing methods result in high complexity of training and learning of medical images and low efficiency and accuracy of medical image analysis.

SUMMARY

The present disclosure is provided to solve the above-mentioned problems existing in the prior art.

The present disclosure is directed to a training method, a training system and a training apparatus of a learning network for medical image analysis, and a computer-readable storage medium. According to the training method, pre-training on a learning network is performed by using an original training data set to obtain a pre-trained learning network, the pre-trained learning network is evaluated to determine whether the pre-trained learning network has a preset evaluation defect, data augmentation is performed on the basis of the original training data set for the existing evaluation defect in a case where the pre-trained learning network has the evaluation defect, and refined training is performed on the learning network using a data augmented training data set based on parameters of a pre-trained model. The disclosed training method can carry out iterative training on the learning network based on limited medical data, so that medical images related to analysis requirements can be obtained quickly and accurately, and the obtained medical images can be analyzed more accurately and more pertinently. Therefore, the complexity of training the medical image analysis learning network is reduced, and the efficiency and accuracy of medical image analysis are improved.

According to a first aspect of the present disclosure, there is provided a training method of a learning network for medical image analysis. The training method includes: acquiring an original training data set for a learning network with a predetermined structure; performing, by a processor, a pre-training on the learning network using the original training data set to obtain a pre-trained learning network; evaluating, by the processor, the pre-trained learning network to determine whether the pre-trained learning network has an evaluation defect; when the pre-trained learning network has the evaluation defect, performing, by the processor, a data augmentation on the original training data set or acquiring new data and adding the new data into the original data set for the evaluation defect; and performing, by the processor, a refined training on the pre-trained learning network using the data augmented training data set.

According to a second aspect of the present disclosure, there is provided a training system for training a learning network for medical image analysis. The training system includes: a communication interface configured to acquire an original training data set; and a processor configured to: perform a pre-training on a learning network with a predetermined structure using the original training data set to obtain a pre-trained learning network; evaluate the pre-trained learning network to determine whether the pre-trained learning network has an evaluation defect; when the pre-trained learning network has the evaluation defect, perform a data augmentation on the original training data set or acquire new data and add the new data into the original data set for the evaluation defect; and perform a refined training on the pre-trained learning network using a data augmented training data set.

According to a third aspect of the present disclosure, there is provided a training apparatus of a learning network for medical image analysis, including a memory and a processor, wherein the memory is used for storing one or more computer program instructions, wherein the one or more computer program instructions are executed by the processor to implement a training method for training a learning network for medical image analysis.

According to a fourth aspect of the present disclosure, there is provided a non-transitory computer-readable storage medium on which computer program instructions are stored, wherein the computer program instructions are executed by a processor to implement a training method for training a learning network for medical image analysis.

With the training method, the training system, the training apparatus of the learning network for medical image analysis and the computer-readable storage medium according to embodiments of the present disclosure, pre-training on a learning network is performed by using an original training data set to obtain a pre-trained learning network, the pre-trained learning network is evaluated to determine whether the pre-trained learning network has a preset evaluation defect, a data augmentation (including two approaches: perform data augmentation based on the original data set; acquire new data and add the new data into the original data set) is performed on the basis of the original training data set for the existing evaluation defect in a case where the pre-trained learning network has the evaluation defect, and a refined training is performed on the pre-trained learning network using a data augmented training data set based on parameters of a pre-trained model. The proposed training may be performed as an iterative training on the learning network based on limited medical data, so that medical images meeting the analysis requirements can be obtained quickly and accurately, and the obtained medical images can be analyzed more accurately and more pertinently. Therefore, the complexity of training the medical image analysis learning network is reduced, and the efficiency and accuracy of medical image analysis are improved.

BRIEF DESCRIPTION OF THE DRAWINGS

In the drawings, which are not necessarily drawn to scale, like reference numerals may describe similar components in different views. Like reference numerals having letter suffixes or different letter suffixes may represent different instances of similar components. The drawings illustrate generally, by way of example, but not by way of limitation, various embodiments, and together with the description and claims, serve to explain the disclosed embodiments. Where appropriate, the same reference numerals are used in all drawings to refer to the same or similar parts. Such embodiments are demonstrative and not intended to be exhaustive or exclusive embodiments of the present device or method.

DETAILED DESCRIPTION

In order to make those skilled in the art to better understand technical solutions of the present disclosure, the present disclosure will be described in detail with reference to the accompanying drawings and specific embodiments. The embodiments of the present disclosure will be further described in detail with reference to the drawings and specific embodiments, but not as a limitation of the present disclosure. If steps described herein are not necessary to be related to each other, the order in which they are described as an example herein should not be regarded as a limitation, and those skilled in the art should know that the order can be adjusted, as long as the logicality between them is not destroyed and the whole process can be realized.

In addition, it should be understood by those of ordinary skill in the art that the drawings provided herein are for the purpose of illustration, and the drawings are not necessarily drawn to scale.

Unless the context explicitly requires, "including", "comprising" and other similar words in the entire description and claims shall be interpreted as the meaning of inclusion rather than exclusive or exhaustive meaning; that is, it means "including but not limited to".

In the description of the present disclosure, it is to be understood that terms "first", "second" and the like are merely used for the purpose of description and cannot be understood to indicate or imply relative importance. In addition, in the description of the present disclosure, "a plurality of" means two or more, unless otherwise specified.

Hereinafter, a medical image analysis method and device according to embodiments of the present disclosure will be described in detail with reference to the accompanying drawings.

Figure 1:
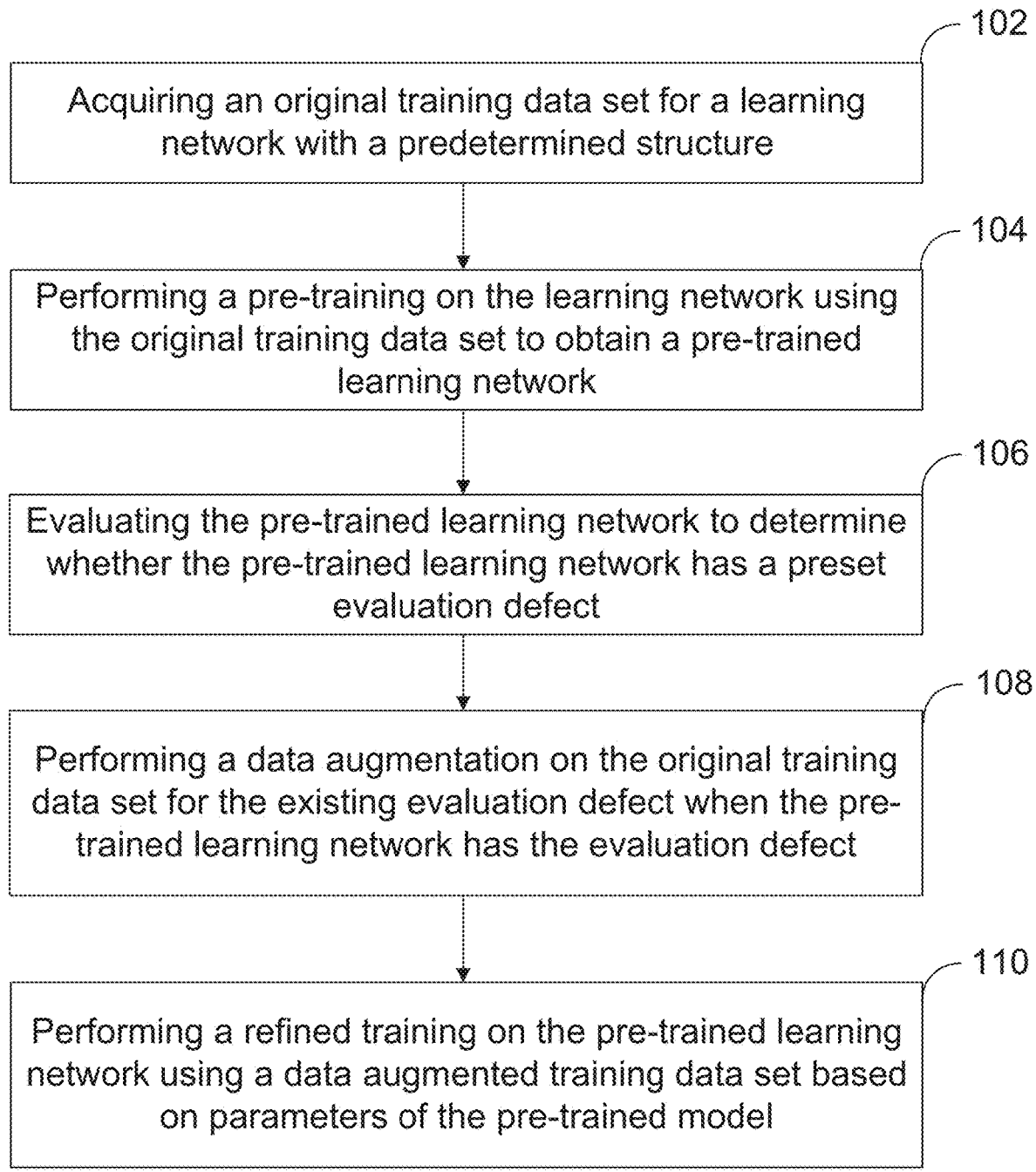
FIG. 1 shows a flowchart of a training method for training a learning network for medical image analysis according to an embodiment of the present disclosure.

FIG. 1 shows a flowchart of a training method for training a learning network for medical image analysis according to an embodiment of the present disclosure. As shown in FIG. 1, the training method may include acquiring an original training data set a learning network with a predetermined structure (step 102). The original training data set may be a training data set without performing various data augmentation processes according to embodiments of the present disclosure. For example, an original training data set may be a training data set on which data augmentation processing other than that in the present disclosure has been performed, and may also be a training data set on which various other preprocesses that are not in the present disclosure have been performed.

For example, in the training of the learning network for medical image analysis, the structure of the learning network (i.e., the deep learning network) may be fixed in advance, and a loss function is set. Here, a training apparatus may be a smart phone, a tablet computer, a notebook computer, a desktop computer, a smart speaker, a smart watch, etc., and may also be integrated in an image acquiring device for acquiring medical images or an image workstation for analyzing various medical images, which is not limited by the embodiments of the present disclosure. Deep learning is a branch of Machine Learning (ML), which is used to realize Artificial Intelligence (AI). Deep learning forms a more abstract high-level to represent attribute categories or features by combining low-level features, so as to discover the distributed feature representation of data. The network model can be trained using supervised learning. The architecture of the network model may include a stack of different blocks and layers, each of which converts more than one input into more than one output. Examples of different layers may include more than one convolutional layer or full convolutional layer, non-linear operator layer, pooling layer or sub-sampling layer, full connection layer and/or final loss layer. Each layer may be connected to an upstream layer and a downstream layer. The network model may include Residual Network (ResNet) model, segmentation network (UNet) model, AlexNet model, GoogLeNet model, Visual Geometry Group (VGG) model, Pyramid Scene Parsing Network (PSPNet) model, DeepLabV3 network model, etc., which is not limited by the embodiments of the present disclosure. The loss function is a function that maps the value of a random event or its related random variables to a non-negative real number to represent the "risk" or "loss" of the random event.

Further, the training apparatus can acquire medical images from a medical imaging device in real time through a communication interface, and manually segment the acquired medical images (for example, manually label the medical images) to obtain the original training data set; or, the medical images can also be acquired in real time from the medical imaging device through the communication interface, the acquired medical images are segmented by using the existing model, and the segmented medical images are manually corrected to obtain the original training data set. That is, image segmentation in the original training data set usually needs manual intervention to ensure its accuracy. Here, the communication interface may include a network adapter, a cable connector, a serial connector, a USB connector, a parallel connector, a high-speed data transmission adapter (such as optical fiber, USB 3.0, Thunderbolt interface, etc.), a wireless network adapters (such as a WiFi adapter), a telecommunications (such as 3G, 4G/LTE, etc.) adapter, etc. The medical imaging device may include X-ray imaging equipment, Magnetic Resonance Imaging (MRI) imaging equipment, ultrasound imaging equipment, nuclear medicine imaging equipment, thermal imaging equipment, medical optical imaging equipment, etc., which is not limited by the embodiments of the present disclosure.

The medical images are images acquired by the medical imaging device, and may include X-ray images (for example, Computed Tomography (CT) images), MRI images, ultrasound images, radionuclide images, etc., which are not limited by the embodiments of the present disclosure. The medical images may be two-dimensional (2D) or three-dimensional (3D) images, and the 3D images may include a plurality of 2D image slices. Further, the medical images may be lung images, liver and kidney images, or images of other parts, which are not limited by the embodiments of the present disclosure.

Image segmentation divides an image into several regions according to features such as gray scale, color, spatial texture, geometric shape, etc., so that these features show consistency or similarity in the same region, but show obvious differences among different regions. Image segmentation methods based on deep learning may include, but are not limited to, image segmentation methods based on feature coding, image segmentation methods based on region selection, image segmentation methods based on Recurrent Neural Network (RNN), image segmentation methods based on upsampling/deconvolution, image segmentation methods based on improved feature resolution, image segmentation methods based on feature augmentation, image segmentation methods using Conditional Random Field (CRF)/Markov Random Field (MRF), etc.

It should be noted that the training apparatus can also receive the medical images acquired by the medical imaging device from a server, which is not limited by the embodiments of the present disclosure. Here, the server may be an independent physical server, such as Picture Archiving and Communication Systems (PACS), or a server cluster or distributed system composed of a plurality of physical servers, or it may also be a cloud server that provides basic cloud computing services such as cloud services, cloud databases, cloud computing, cloud functions, cloud storage, network services, cloud communication, middleware services, domain name services, security services, CDN, and big data and artificial intelligence platforms, etc., which is not limited by the embodiments of the present disclosure. The training apparatus and the server may be directly or indirectly connected through wired or wireless communication, which is not limited by the embodiments of the present disclosure.

In some embodiments, the training method may further include, performing, by a processor, a pre-training on the learning network using the original training data set to obtain a pre-trained learning network (step 104).

For example, after obtaining the original training data set, the processor of the training apparatus may perform the pre-training on the learning network using the original training data set to obtain the pre-trained learning network. Here, the processor may be a processing apparatus including more than one general-purpose processing apparatus, such as a microprocessor, a central processing unit (CPU), a graphics processing unit (GPU), and the like. More specifically, the processor may be a complex instruction set computing (CISC) microprocessor, a reduced instruction set computing (RISC) microprocessor, a very long instruction word (VLIW) microprocessor, a processor running other instruction sets, or a processor running a combination of instruction sets. The processor may also be more than one dedicated processing apparatus, such as an application specific integrated circuit (ASIC), a field programmable gate array (FPGA), a digital signal processor (DSP), a system on a chip (SoC), and the like.

In some embodiments, pre-training a learning network includes determining more than one parameter of at least one layer in the learning network. The learning network may include one or a combination of Convolutional Neural Network (CNN), recurrent neural network and Recursive Neural Network (RNN). Convolutional neural network is a type of Feedforward Neural Network (FNN) which contains convolution calculation and has a deep structure. Convolutional neural network has the ability of representing learning, and can invariantly classify input information according to its hierarchical structure. The convolutional layer of the convolutional neural network model may include at least one filter or kernel. More than one parameter of the at least one filter, such as kernel weight, size, shape, structure, etc., can be determined by, for example, a training process based on back propagation. The recurrent neural network is a type of recursive neural network, which takes sequence data as input and recurses in the evolution direction of the sequence, and in which all nodes (recurrent units) are connected in chain. The recursive neural network is an Artificial Neural Network (ANN) which has tree-like hierarchical structure and in which network nodes recurs input information according to their connection order.

In some embodiments, the training method may further include, evaluating, by the processor, the pre-trained learning network to determine whether the pre-trained learning network has a preset evaluation defect (step 106).

For example, the processor of the training apparatus may evaluate the pre-trained learning network to determine whether the pre-trained learning network has a preset evaluation defect. In some embodiments, the evaluation defect may include an imbalance (e.g., a significant difference) in detection rates of target objects at different positions and/or with different attributes, and a training data set used in a stage of refined training targeted for the evaluation defect is obtained by performing more sampling and augmentation on relevant training data of target objects with lower detection rates than those at other positions and/or with other attributes and adding the augmented relevant training data to existing training data set. The preset evaluation defect may be associated with clinical concerns, for example, in the task of coronary artery segmentation, whether a blood vessel branch is fractured, whether the coronary stent is fully segmented, whether a precise segmentation boundary is obtained at the plaque, etc.; or, in the task of heart multi-label tissue segmentation, whether there are tissue labels intermingled with each other, whether smooth tissue boundaries are obtained, etc.; or, in the task of lung nodule detection, whether the detection rate of ground glass lung nodules (or non-independent lung nodules) meets the requirements, etc. By evaluating the pre-trained learning network, it can be determined whether the current network model performs well. The evaluation index can be set and adjusted according to clinical concerns of doctors, and the data set can be trained for targeted data augmentation according to the evaluation index (see the description below). It is easier for doctors to determine clinical concerns than to have them determine the abstract algorithm indicators (such as ROC) for the training stage and configuring the training methods. In addition, targeted data augmentation based on the clinical concerns suggested by doctors can enable the learning network to solve the clinical concerns in a targeted manner, thereby improving the controllability, traceability and repeatability of the learning network, significantly shortening the development cycle, and increasing the interpretability of the learning network (especially its training stage) for users who are not computer programmers (such as doctors).

It should be noted that the process of evaluating the pre-trained learning network can be completed manually or through a computer program, for example, whether a blood vessel branch is fractured can be evaluated by calculating the overlap ratio of the coronary artery segmentation point cloud and the labeling result (such as the ground truth centerline point cloud), which is not limited by the embodiments of the present disclosure.

Exemplarily, the medical image may include a blood vessel related image, the medical image analysis may include segmentation of target artery, and the preset evaluation defect may include blood vessel branch fracture, vein mixing in artery, uneven segmentation at plaque and low recognition rate of an implant; the medical image may include a lung related image, the medical image analysis may include lung nodule detection, and the preset evaluation defect may include the detection rate of ground glass nodules is lower than that of solid nodules and the detection rate of nodules close to other tissues is lower than that of nodules far away from other tissues.

In some embodiments, the training method may further include, performing, by the processor, a data augmentation on the original training data set for the evaluation defect when the pre-trained learning network has the evaluation defect (step 108).

For example, if the pre-trained learning network has the evaluation defect, the processor of the training apparatus may perform the data augmentation on the original training data set or collect new data and add the new data into the original data set for the existing evaluation defect. Here, the data augmentation is mainly used to prevent over-fitting. Through the data augmentation, the amount of data can be increased considerably and the trained model has a certain anti-noise ability. Data augmentation methods for may include rotation/reflection transformation, flip (horizontal or vertical) transformation, scaling transformation, translation transformation, scale transformation, contrast transformation, noise disturbance, color change, etc., which are not limited by the embodiments of the present disclosure. In some embodiments, a specific data augmentation method can be adopted for the existing evaluation defect. For example, in coronary CTA, the intermediate ramus is very important for cardiovascular clinical diagnosis, but the training data of CTA usually only shows a short intermediate ramus, which leads to poor performance of the pre-trained learning network in detecting the intermediate ramus. Thus, in step 108, samples with shorter intermediate ramus can be identified, and the area near the intermediate ramus in these samples can be augmented, so that the augmented training data can make it easier for the learning network to pay more attention to the intermediate ramus. For another example, when detecting lung nodules, the pre-trained learning network has a poor detection rate for ground glass lung nodules, which however are very important for clinical diagnosis of lung diseases. Thus, in step 108, samples labeled with ground glass lung nodules can be identified from the original training data set, the samples are sampled, augmented and expanded, and then added to the training data set, so that the augmented training data can enable the learning network to better learn image features of ground glass lung nodules.

Exemplarily, in the case where the pre-trained learning network has both of the problems of vein mixing and blood vessel branch fracture, the processor of the training apparatus may perform the data augmentation for the vein mixing problem or blood vessel branch fracture problem. The compatibility of the model and the robustness of the model can be improved by performing the data augmentation on the original training data set for the existing evaluation defect in a case where the pre-trained learning network has the evaluation defect.

In some embodiments, the training method may further include, performing, by the processor, a refined training on the pre-trained learning network using a data augmented training data set based on parameters of a pre-trained model (step 110). Note that the learning network may be the learning network with the predetermined structure set in step 102, and the data augmentation processing may be based on the original training data set (even if the original training data set has defects such as unbalanced samples or insufficient number of samples). In this way, users do not have to spend time and energy on designing, analyzing and testing the structure and loss function of a new learning network, but can spend less time and energy to train the learning network. Training steps 106 and 108 identify the defect of the clinical evaluation index (which may be given according to the needs of doctors) targeted by each training stage and automatically perform targeted data augmentation, so as to meet the requirements of clinical application more flexibly and thoughtfully, and further reduce the time and energy spent by users on determining the details of the training process.

For example, the processor of the training apparatus may perform the refined training on the learning network using the data augmented training data set based on the parameters of the pre-trained model, i.e., fine-adjust or fine-tune. Here, the refined training is a process including modifying the structure of the pre-trained learning network, selectively loading the weights of the pre-trained learning network, and then retraining the learning network using the data augmented training data set. In the embodiments of the present disclosure, the refined training may be performed in stages (to eliminate or mitigate the various evaluation defects in the pre-trained learning network) and each stage of the refined training can use the same loss function.

Exemplarily, in the case where the data augmented training data set is large and similar to the original training data set, or when the data augmented training data set is large and not similar to the original training data set, the learning network may be refined. The learning network can be trained quickly with a relatively small amount of data to obtain a good training result by performing the refined training on the learning network.

It should be noted that the above-mentioned training process from step 102 to step 110 may be performed iteratively, and thus also referred to as an "iterative training process", which will be described in detail later.

In the training method of the learning network for medical image analysis according to the embodiments of the present disclosure, the pre-training on the learning network is performed by using the original training data set to obtain the pre-trained learning network, the pre-trained learning network is evaluated to determine whether the pre-trained learning network has the preset evaluation defect, the data augmentation (including two aspects: perform data augmentation based on the original data set; acquire new data and add the new data into the original data set) is performed on the basis of the original training data set for the existing evaluation defect if the pre-trained learning network has the evaluation defect, and the refined training is performed on the learning network using the data augmented training data set based on the parameters of the pre-trained model. The learning network may be trained iteratively through an iterative training based on limited medical data, so that medical images related to analysis requirements can be obtained quickly and accurately, and the obtained medical images can be analyzed more accurately and more pertinently. Therefore, the complexity of training the medical image analysis learning network is reduced, and the efficiency and accuracy of medical image analysis are improved.

In some embodiments, in a case where the pre-trained learning network has at least two evaluation defects, the data augmentation is performed on the original training data set and the training on the learning network using the data augmented training data set is performed in stages and each stage is to eliminate or mitigate an evaluation defect. In some embodiments, a training data set used in each stage of the refined training is used for data augmentation in a next stage of the refined training for that stage's corresponding evaluation defect.

For example, the pre-trained learning network may have at least two evaluation defects, such as vein mixing and blood vessel branch fracture, or vein mixing, blood vessel branch fracture and uneven segmentation at plaque, etc. When the pre-trained learning network has at least two evaluation defects, the processor of the training apparatus may perform the data augmentation on the original training data set and may perform the refined training in stages on the learning network using the data augmented training data set in stages, with each stage addressing one evaluation defect. Here, the training data set used in each stage of the refined training is used for the next stage of the refined training after data augmentation for the corresponding evaluation defect.

In some embodiments, a Nth learning network obtained through a Nth stage of the refined training eliminates all evaluation defects targeted by the Nth stage and its prior stages, including a first stage of the refined training through the Nth stage of the refined training, where N is a positive integer. The refined training is performed in stages until all preset evaluation defects are eliminated.

For example, after the Nth stage of the refined training, the Nth learning network can be obtained. The Nth learning network has eliminated all evaluation defects targeted by the first stage of the refined training to the Nth stage of the refined training, here, N is a positive integer, that is, an integer greater than or equal to 1. All the preset evaluation defects can be eliminated by performing the refined training in stages on the learning network.

In some embodiments, the training method of the learning network for medical image analysis further includes: evaluating the Nth learning network obtained through the Nth stage of the refined training to determine an evaluation defect still existing in the Nth learning network.

For example, after the Nth stage of the refined training, the processor of the training apparatus may evaluate the obtained Nth learning network to determine an evaluation defect still existing in the Nth learning network.

In some embodiments, performing the refined training in stages further includes: performing data augmentation on the original training data set for a first evaluation defect of the at least two evaluation defects to obtain a first training data set; performing a first stage of the refined training on the learning network using the first training data set and based on the parameters of the pre-trained model to obtain a first learning network; evaluating the first learning network to determine whether the first learning network has the first evaluation defect and a second evaluation defect; performing data augmentation on the first training data set for the second evaluation defect to obtain a second training data set in a case where the first learning network does not have the first evaluation defect but has the second evaluation defect; and performing a second stage of the refined training on the first learning network using the second training data set and based on model parameters of the first learning network to obtain a second learning network.

For example, the processor of the training apparatus may perform the data augmentation on the original training data set for the first evaluation defect (e.g., vein mixing) of the at least two evaluation defects (e.g., vein mixing and blood vessel branch fracture) to obtain the first training data set; next, the processor of the training apparatus may perform the first stage of the refined training on the learning network using the first training data set and based on the parameters of the pre-trained model to obtain the first learning network; the processor of the training apparatus may determine whether the first learning network has the first evaluation defect and the second evaluation defect by evaluating the first learning network, and perform the data augmentation on the first training data set for the second evaluation defect to obtain the second training data set in the case where the first learning network does not have the first evaluation defect but has the second evaluation defect; further, the processor of the training apparatus may perform the second stage of the refined training on the first learning network using the second training data set and based on the model parameters of the first learning network to obtain the second learning network.

In some embodiments, when N is greater than 1, the Nth stage of the refined training further includes: performing data augmentation on a (N−1)th training data set for a Nth evaluation defect to obtain a Nth training data set; and performing the Nth stage of the refined training on a (N−1)th learning network using the Nth training data set and based on model parameters of the (N−1)th learning network to obtain the Nth learning network.

For example, when N is greater than 1, the processor of the training apparatus may perform the data augmentation on the (N−1)th training data set for the Nth evaluation defect to obtain the Nth training data set; further, the processor of the training apparatus may perform the Nth stage of the refined training on the (N−1)th learning network using the Nth training data set and based on the model parameters of the (N−1)th learning network to obtain the Nth learning network.

It should be noted that the (N+1)th training data set may be a data set which includes the Nth training data set and adds the above-mentioned targeted new data cluster, or may also be a data set which deletes a subset of the training data set and then adds the above-mentioned targeted new data cluster, which is not limited by the embodiments of the present disclosure.

In some embodiments, an evaluation defect targeted by each stage of the refined training is set so that an evaluation defect targeted by a previous stage is more important than that targeted by a later stage. In some embodiments, the priority of evaluating the importance of defects can be determined according to specific clinical requirements of doctors. For example, in the segmentation and reconstruction task of clinical CCTA images, sometimes doctors pay more attention to vein mixing in arteries than blood vessel branch fracture caused by artifacts, that is, the importance of the evaluation defect of vein mixing in arteries is higher than that of the evaluation defect of blood vessel branch fracture caused by artifacts, so the evaluation defects targeted by the previous stage and the later stage may be set accordingly, so as to better meet the specific clinical requirements of doctors. In some embodiments, the priority of the importance of the evaluation defects can be determined by further considering the interaction of each evaluation defect with each. Still taking the segmentation and reconstruction task of clinical CCTA images as an example, by allowing to perform the data augmentation for vein mixing in arteries targeted by the previous stage, the data augmented training data set significantly reduces the number of veins that are mistakenly segmented as arteries, thus reducing the workload of blood vessel branch fracture in the later stage. To the contrary, by allowing to perform the data augmentation for blood vessel branch fracture targeted by the previous stage, the frequency of vein mixing will be increased, thus increasing the overall workload of the training.

For example, the processor of the training apparatus may set the evaluation defect targeted by each stage of the refined training in advance, so that the importance of the evaluation defect targeted by the previous stage is higher than that of the evaluation defect targeted by the later stage. The evaluation defect with high importance can be eliminated first by determining the execution order of each stage based on the evaluation defects.

In some embodiments, if there are an evaluation defect in which a missed detection rate is given priority over a false positive rate and another evaluation defect in which the false positive rate is given priority over the missed detection rate in the preset evaluation defects, a training stage targeted for the former evaluation defect is before a training stage targeted for the latter evaluation defect.

For example, in the case where there are the false positive rate and the missed detection rate in the preset evaluation defects, if the missed detection rate is given priority, the priority of the evaluation defect corresponding to the missed detection rate is set higher than that of the evaluation defect corresponding to the false positive rate. Further, the execution order of the training stage targeted for the evaluation defect corresponding to the missed detection rate may be set before that of the training stage targeted for the evaluation defect corresponding to the missed detection rate based on their priorities. That is, the training stage targeting the higher-priority evaluation defect is preferentially executed.

In some embodiments, the training data set used in each stage of the refined training is obtained by following steps: identifying training data with an evaluation defect targeted by a current stage of the refined training in a training data set used in the previous stage of the refined training according to an evaluation result of the previous stage of the refined training; and performing more sampling and augmentation on the identified training data and adding the augmented training data into the training data set used in the previous stage of the refined training.

For example, the processor of the training apparatus may screen out the training data with the evaluation defect targeted by the current stage of the refined training in the training data set used in the previous stage of the refined training according to the evaluation result of the previous stage of the refined training; further, the processor of the training apparatus may perform more sampling and augmentation on the identified training data and add the augmented training data into the training data set used in the previous stage of the refined training.

In some embodiments, obtaining the training data set used in each stage of the refined training further includes: performing more sampling and augmentation on the identified training data and adding the augmented training data into the training data set used in the previous stage of the refined training, and deleting a part of other training data in the training data set used in the previous stage of the refined training.

For example, after performing more sampling and augmentation on the identified training data and adding the augmented training data into the training data set used in the previous stage of the refined training, the processor of the training apparatus may delete a part of other training data in the training data set used in the previous stage of the refined training, so as to save the storage space of the training apparatus and reduce the data computation.

In some embodiments, the training data set used in each stage of the refined training is obtained by following steps: acquiring more original data according to the evaluation result of the previous stage of the refined training and identifying training data with the evaluation defect targeted by the current stage of the refined training from the original data; and performing more sampling and augmentation on the identified training data and adding the augmented training data into the training data set used in the previous stage of the refined training.

For example, the processor of the training apparatus may acquire more original data according to the evaluation result of the previous stage of the refined training and screen out the training data with the evaluation defect targeted by the current stage of the refined training from the original data; further, the processor of the training apparatus may perform more sampling and augmentation on the identified training data and add the augmented training data into the training data set used in the previous stage of the refined training.

Next, the training method of the learning network for medical image analysis will be described in detail through specific examples.

Figure 2B:
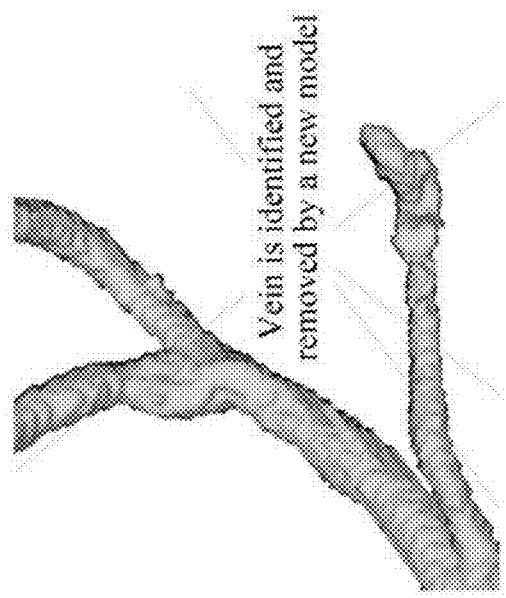
FIGS. 2(a) to 2(c) show schematic diagrams of a vein mixing according to an embodiment of the present disclosure.
Figure 2C:
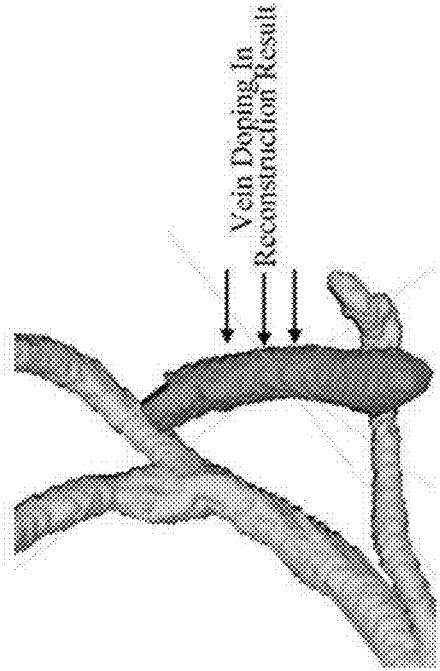
Figure 2A:
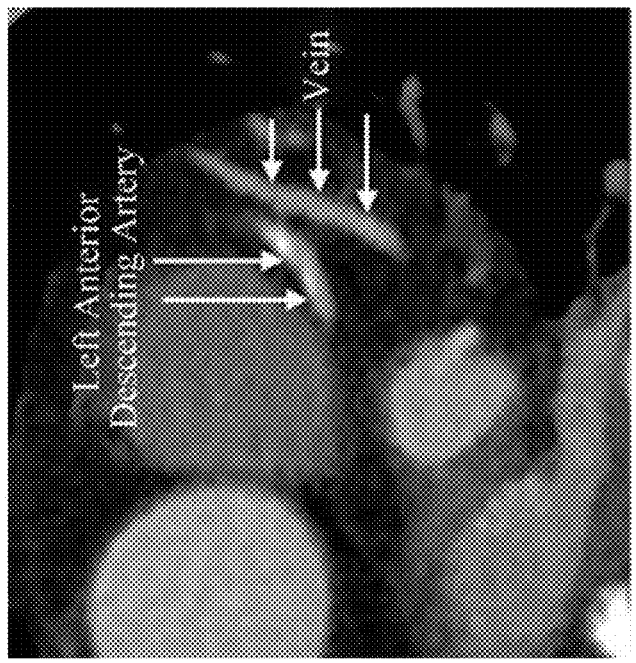

FIGS. 2(a) to 2(c) show schematic diagrams of vein mixing according to an embodiment of the present disclosure. Taking the input medical image as a Coronary Computed Tomography Angiography (CCTA) image as an example, as shown in FIG. 2(a), in the CCTA image, since the contrast intensity of the artery is close to that of the vein, which results that the model (i.e., the above-mentioned learning network) cannot correctly distinguish the artery from the vein, or mistakes the vein for the artery, there is vein mixing in the final artery segmentation, as shown in FIG. 2(b). After performing directional adjustment on the model by using an iterative training strategy, the new model has the ability to correctly distinguish arteries from veins, so that the doped vein can be identified and removed, as shown in FIG. 2(c). Therefore, the problem of vein mixing is solved.

Figure 3B:
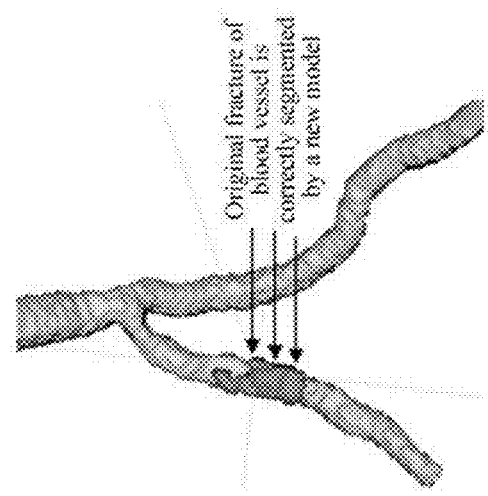
FIGS. 3(a) to 3(c) show schematic diagrams of a blood vessel branch fracture according to an embodiment of the present disclosure.
Figure 3C:
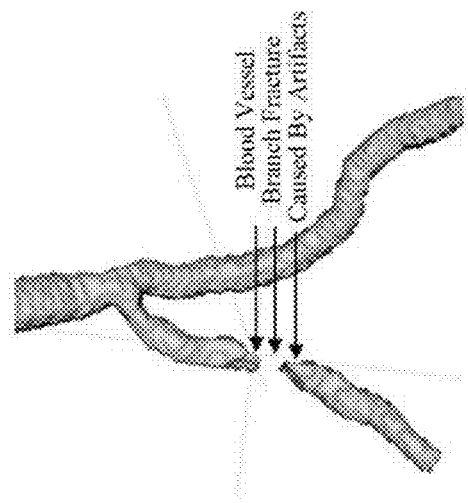
Figure 3A:
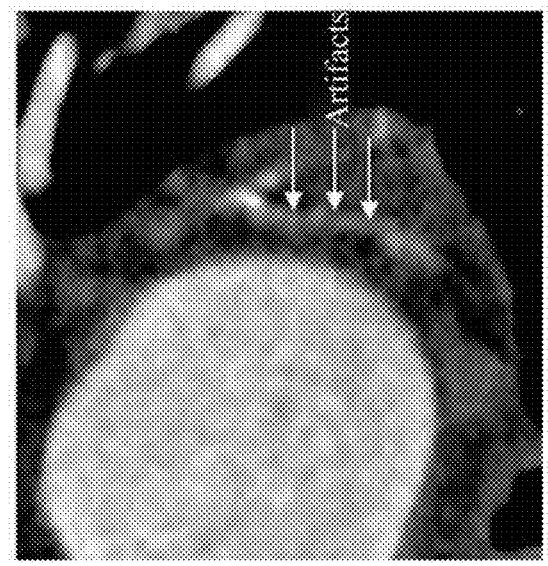

FIGS. 3(a) to 3(c) show schematic diagrams of blood vessel branch fracture according to an embodiment of the present disclosure. Still taking the input medical image as a CCTA image as an example, as shown in FIG. 3(a), in the CCTA image, the presence of motion artifacts leads that the model cannot correctly segment coronary blood vessels at the artifacts and further leads to the occurrence of coronary blood vessel branch fracture in the result of the 3D blood vessel reconstruction, as shown in FIG. 3(b). After performing directional adjustment on the model by using the iterative training strategy, the new model has the ability to correctly segment the coronary blood vessels at the artifacts, so that the coronary blood vessels at the artifacts can be correctly reconstructed, as shown in FIG. 3(c). Therefore, the problem of blood vessel branch fracture is solved.

Figure 4B:
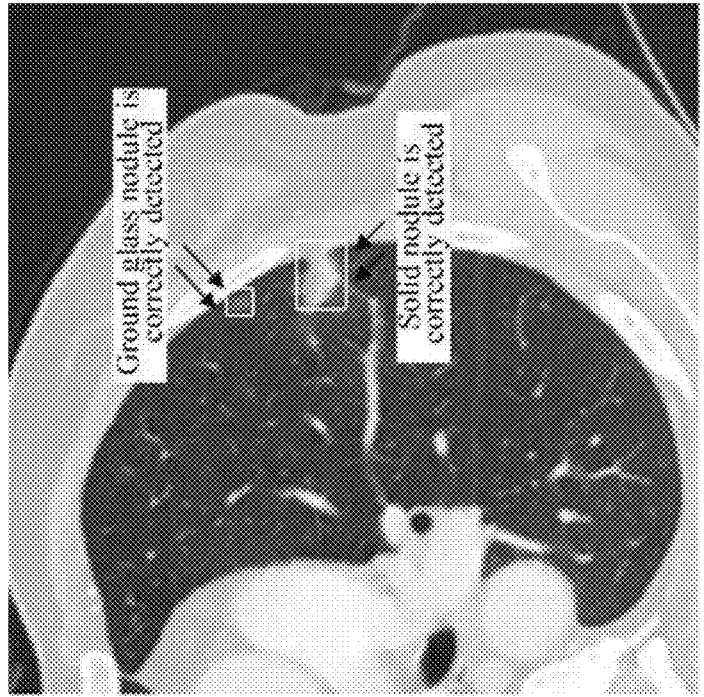
FIGS. 4(a) and 4(b) show schematic diagrams of solid nodules and ground glass nodules according to an embodiment of the present disclosure.
Figure 4A:
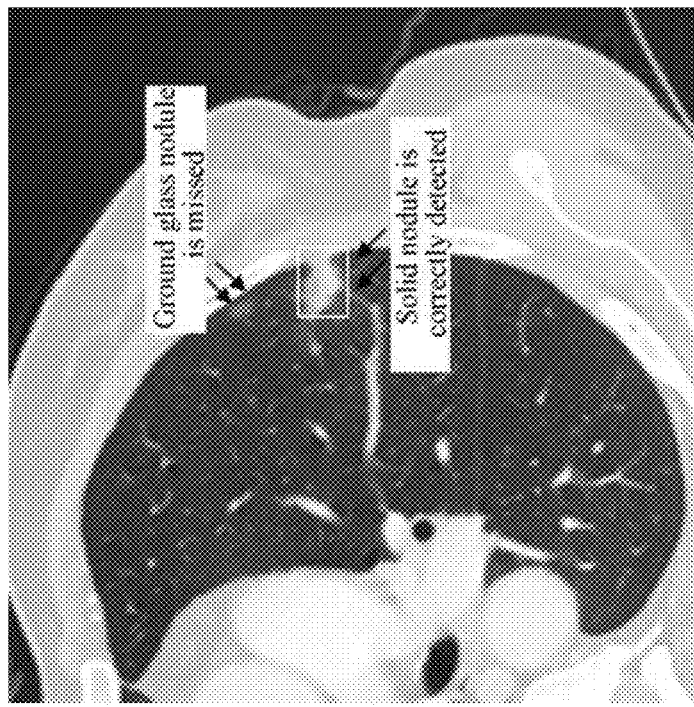

FIGS. 4(a) and 4(b) show schematic diagrams of solid nodules and ground glass nodules according to an embodiment of the present disclosure. Taking the input medical image as a lung Computed Tomography (CT) image as an example, in the lung CT image, since the solid nodules is similar to human soft tissue in the density and they are clearly presented in the lung CT image, while the ground glass nodules are translucent and fuzzy in the lung CT image, the model can correctly detect the solid nodules, but cannot detect the ground glass nodules, as shown in FIG. 4(a). After performing directional adjustment on the model by using the iterative training strategy, the new model strengthens the learning of ground glass nodules pertinently, thus the solid nodules and the ground glass nodules can be correctly detected, as shown in FIG. 4(b).

Figure 5:
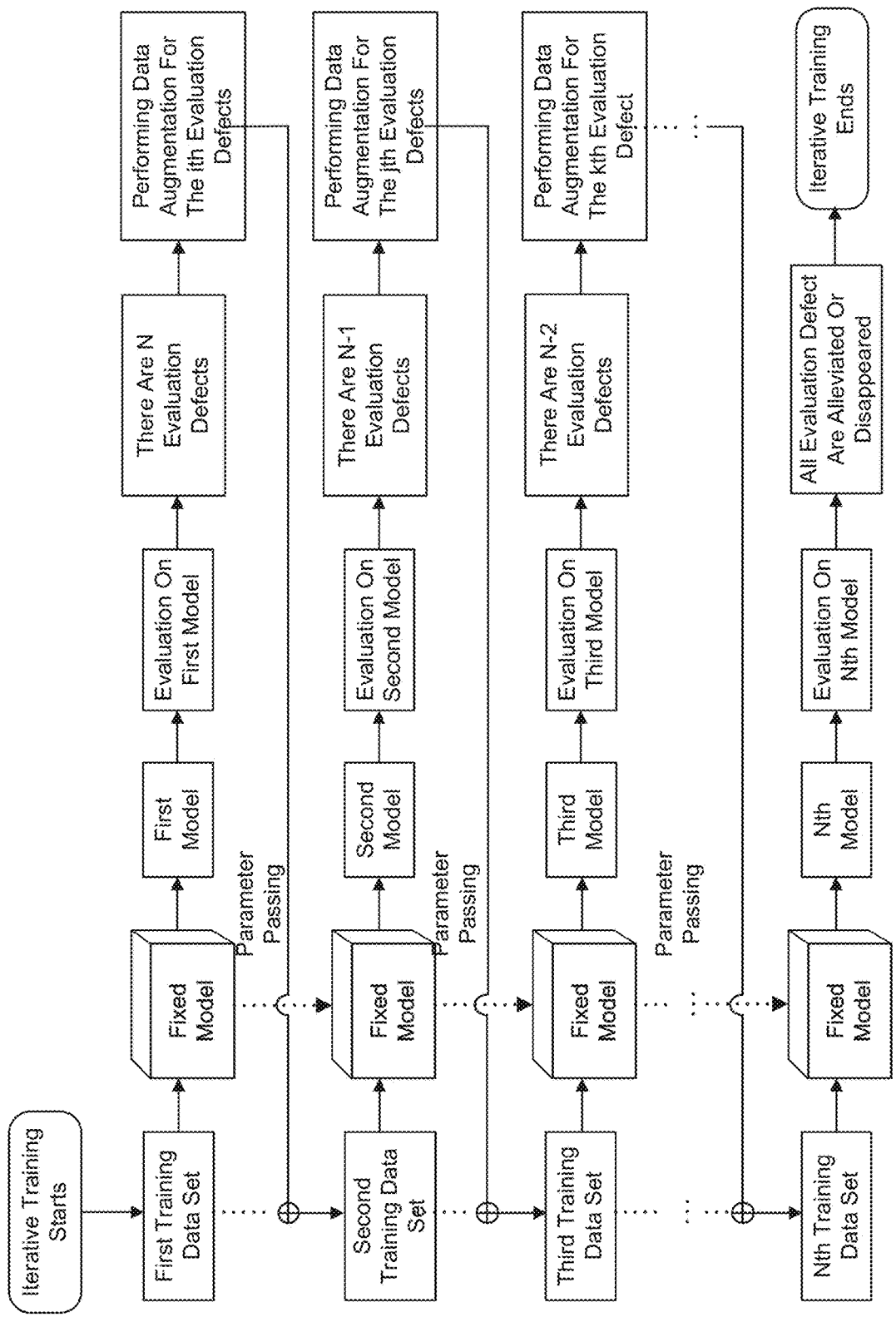
FIG. 5 shows a schematic diagram of an iterative training process according to an embodiment of the present disclosure.

FIG. 5 shows a schematic diagram of an iterative training process according to an embodiment of the present disclosure. As shown in FIG. 5, at the beginning of the iterative training, the existing training data is named as the first training data set, and the first training data set is input into a deep learning convolutional network. A feature map of the input data is extracted by using 3D convolution kernel, and the error is propagated back by comparing with the gold standard image to update parameters of a model with a fixed structure (thus referred as a fixed model). The pre-training of the model is completed by repeating the above steps, and the pre-trained model is named as a first model. Then, the first model is evaluated to obtain an evaluation result. The evaluation result is compared with the ground truth value to determine the evaluation defect of the first model. Further, when the first model has N evaluation defects, the first training data set is sampled and augmented for the ith evaluation defect of the N evaluation defects, and the sampled and the augmented training data is added to the first training data set to obtain the second training data set. The above steps are repeated, the model carry parameters of the Nth model, and the next stage of the refined training is performed on the model using the (N+1)th training data set until the training converges, that is, all evaluation defect are eliminated or mitigated.

Figure 6:
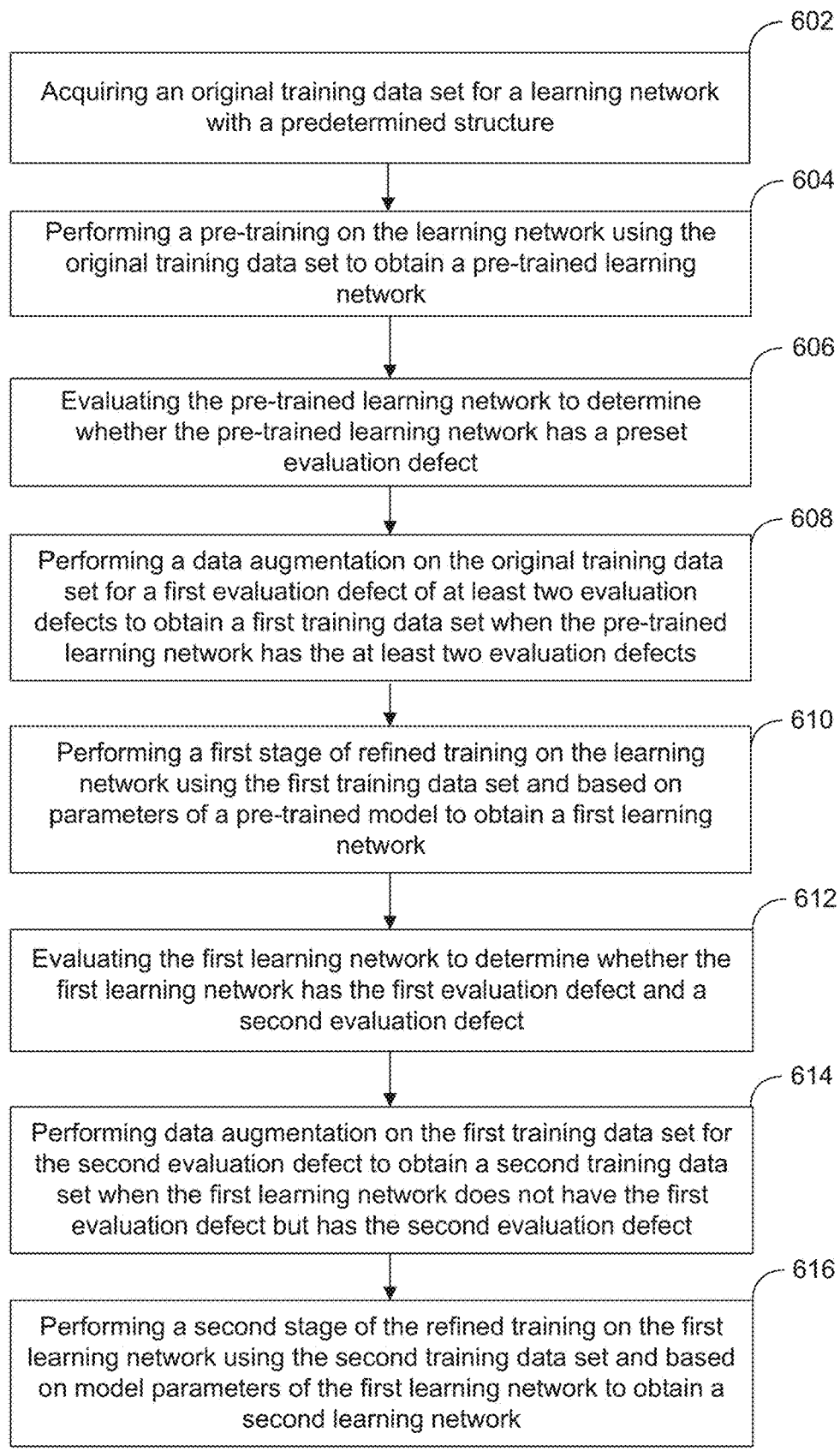
FIG. 6 shows a flowchart of a training method for training a learning network for medical image analysis according to an embodiment of the present disclosure.

FIG. 6 shows a flowchart of a training method of a learning network for medical image analysis according to an embodiment of the present disclosure. As shown in FIG. 6, the training method includes the following steps. The method starts with a step of acquiring an original training data set for a learning network with a predetermined structure (step 602). The method may also include a step of performing a pre-training on the learning network using the original training data set to obtain a pre-trained learning network (step 604). The method may also include a step of evaluating the pre-trained learning network to determine whether the pre-trained learning network has a preset evaluation defect (step 606). The method may also include a step of performing data augmentation on the original training data set for a first evaluation defect of at least two evaluation defects to obtain a first training data set in a case where the pre-trained learning network has the at least two evaluation defects (step 608). The method may also include a step of performing a first stage of refined training on the learning network using the first training data set and based on parameters of a pre-trained model to obtain a first learning network (step 610). The method may also include a step of evaluating the first learning network to determine whether the first learning network has the first evaluation defect and a second evaluation defect (step 612). The method may also include a step of performing data augmentation on the first training data set for the second evaluation defect to obtain a second training data set when the first learning network does not have the first evaluation defect but has the second evaluation defect (step 614). The method may also include a step of performing a second stage of the refined training on the first learning network using the second training data set and based on model parameters of the first learning network to obtain a second learning network (step 616).

In the training method of the learning network for medical image analysis according to the embodiment of the present disclosure, medical images meeting the analysis requirements can be acquired quickly and accurately, and the acquired medical images can be analyzed more accurately and more pertinently. Therefore, the complexity of training the medical image analysis learning network is reduced, and the efficiency and accuracy of medical image analysis are improved.

The following are device embodiments of the present disclosure, which can be used to execute the method embodiments of the present disclosure. For details that are not disclosed in the device embodiments of the present disclosure, please refer to the method embodiments of the present disclosure.

Figure 7:
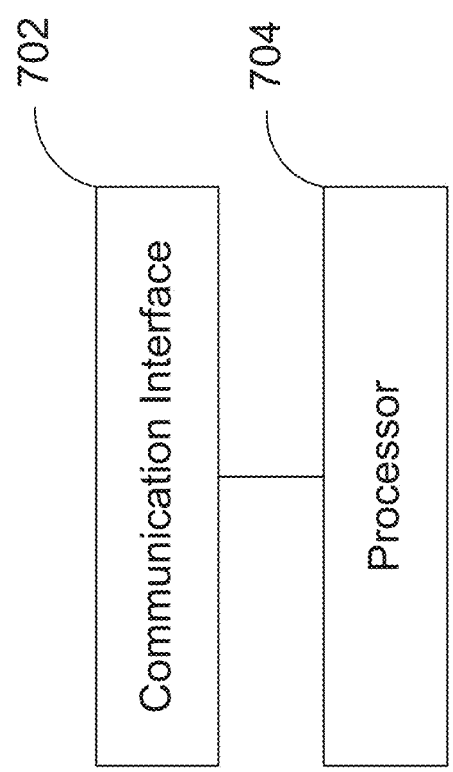
FIG. 7 shows a block diagram of a training system for training a learning network for medical image analysis according to an embodiment of the present disclosure.

FIG. 7 shows a block diagram of a training system of a learning network for medical image analysis according to an embodiment of the present disclosure. As shown in FIG. 7, the training system may include a communication interface 702 and a processor 704.

For example, the communication interface 702 is configured to acquire an original training data set, and the processor 704 is configured to perform a training method for training a learning network for image analysis, similar to the training method described in detailed above, which will not be repeated here. In some embodiments, the processor 704 may perform a pre-training on a learning network with a predetermined structure using the original training data set to obtain a pre-trained learning network; evaluate the pre-trained learning network to determine whether the pre-trained learning network has a preset evaluation defect; perform a data augmentation on a basis of the original training data set or acquire new data and add the new data into the original data set for the existing evaluation defect when the pre-trained learning network has the evaluation defect; and perform a refined training on the learning network using a data augmented training data set based on parameters of a pre-trained model. In some embodiments, the processor 704 may also be configured to present a user interface to prompt the user to input settings for the structure of the learning network. For example, a list or menu of various structures of the learning network may be presented on the user interface for the user to select, and the learning network with the predetermined structure selected by the user is used for the subsequent training process.

Figure 8:
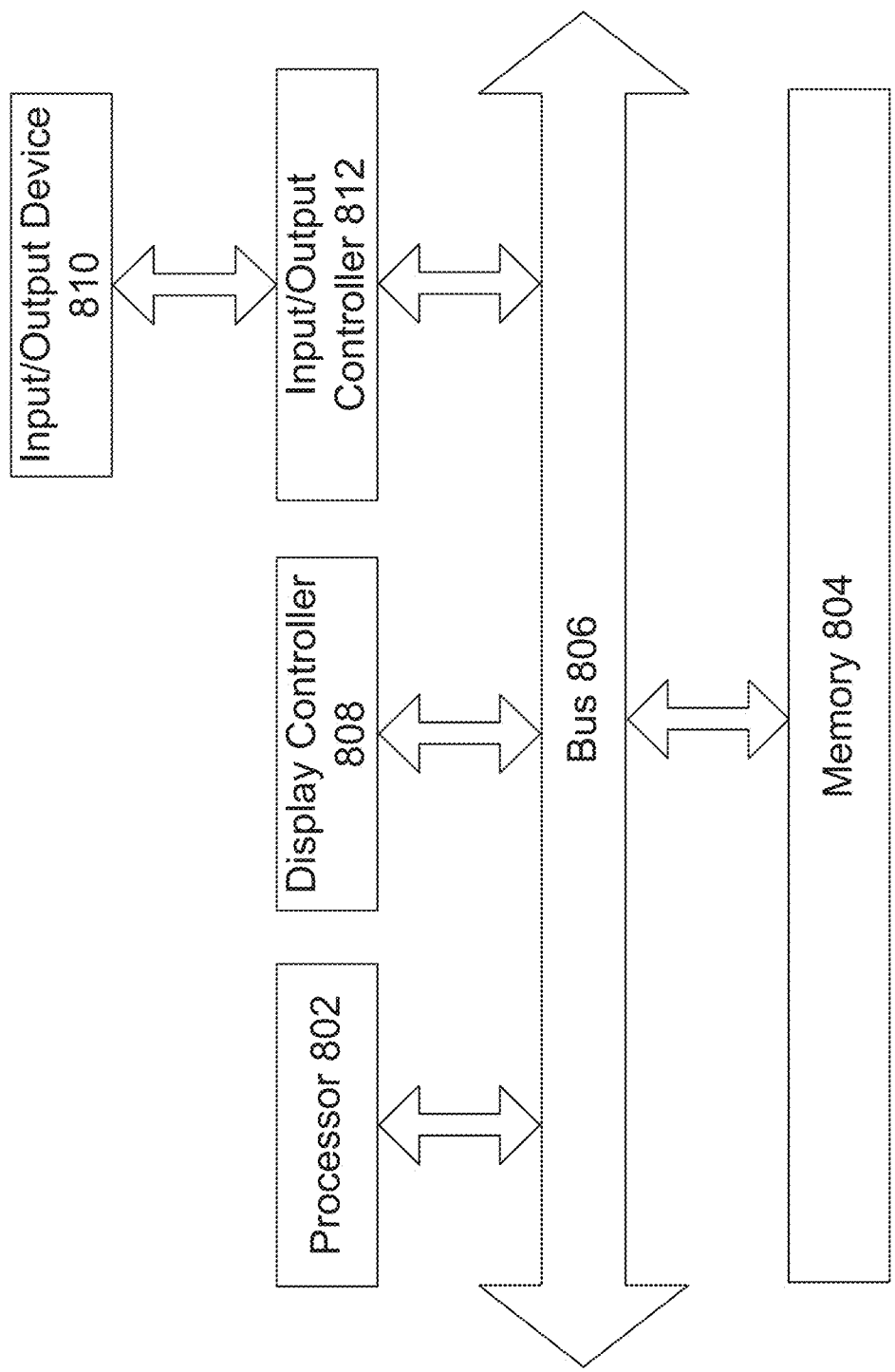
FIG. 8 shows a structural block diagram of a training apparatus for training a learning network for medical image analysis according to an embodiment of the present disclosure.

FIG. 8 shows a structural block diagram of a training apparatus according to an embodiment of the present disclosure. As shown in FIG. 8, the training apparatus is a general data processing device, including a general computer hardware structure, and the training apparatus includes at least a processor 802 and a memory 804. The processor 802 and the memory 804 are connected through a bus 806. The memory 804 is adapted to store instructions or programs executable by the processor 802. The processor 802 may be an independent microprocessor or a set of one or more microprocessors. Thus, the processor 802 executes the method flow of the embodiments of the present disclosure as described above by executing commands stored in the memory 804, so as to realize the processing of data and the control of other devices. The bus 806 connects the above plurality of components together and connects the components to a display controller 808, a display device and an input/output (I/O) device 810. The input/output (I/O) device 810 may be a mouse, a keyboard, a modem, a network interface, a touch input device, a somatosensory input device, a printer, and other devices known in the art. Typically, the input/output (I/O) device 810 is connected to the system through an input/output (I/O) controller 812.

The memory 804 may store software components, such as an operating system, a communication module, an interaction module and an application program. Each of the modules and applications described above corresponds to achieving one or more functions and a set of executable program instructions of the method described in the embodiments of the present disclosure.

In some embodiments, the training apparatus may be located somewhere, scattered in many places, or it can be a distributed training apparatus, for example, the training apparatus is set in the cloud, which is not limited by the embodiments of the present disclosure.

The flowcharts and/or block diagrams of methods, systems, and computer program products according to the embodiments of the present disclosure described above describe various aspects of the present disclosure. It should be understood that each block of the flowchart and/or block diagram and the combination of blocks in the flowchart illustrations and/or block diagram may be implemented by computer program instructions. These computer program instructions may be provided to a processor of a general-purpose computer, a special-purpose computer, or other programmable data processing apparatus to generate a machine such that instructions (executed via the processor of the computer or other programmable data processing apparatus) create means for implementing functions/actions specified in the flowcharts and/or block diagram blocks or blocks.

Meanwhile, as will be realized by those skilled in the art, various aspects of the embodiments of the present disclosure may be implemented as systems, methods or computer program products. Therefore, various aspects of the embodiments of the present disclosure may take the following forms: a complete hardware implementation, a complete software implementation (including firmware, resident software, microcode, etc.) or an implementation combining software aspects with hardware aspects, which can be generally referred to as "circuit", "module" or "system" herein. Further, aspects of the present disclosure may take the following form: a computer program product implemented in one or more computer-readable media having computer-readable program code implemented thereon.

Any combination of one or more computer-readable media may be utilized. The computer-readable medium may be a computer-readable signal medium or a computer-readable storage medium. The computer-readable storage medium may be, for example, but not limited to, an electronic, magnetic, optical, electromagnetic, infrared or semiconductor system, apparatus or device, or any appropriate combination of the foregoing. More specific examples (non-exhaustive enumeration) of computer-readable storage media will include the following items: electrical connection with one or more wires, portable computer floppy disk, hard disk, random access memory (RAM), read only memory (ROM), erasable programmable read only memory (EPROM or flash memory), optical fiber, portable optical disk read only memory (CD-ROM), optical storage device, magnetic storage device, or any appropriate combination of the foregoing. In the context of the embodiments of the present disclosure, the computer-readable storage medium may be any tangible medium capable of containing or storing programs used by or in conjunction with an instruction execution system, apparatus or device.

The computer program code for performing operations on various aspects of the present disclosure may be written in any combination of one or more programming languages, the programming languages including: object-oriented programming languages such as Java, Smalltalk, C++, PHP, Python, etc., and conventional process programming languages such as "C" programming language or similar programming languages. The program code may be completely and partially executed on the user computer as an independent software package; partially on the user computer and partially on the remote computer; or completely on the remote computer or server. In the latter case, the remote computer may be connected to the user computer through any type of network including a Local Area Network (LAN) or a Wide Area Network (WAN), or may be connected to an external computer (for example, through using the Internet of an Internet service provider).

These computer program instructions may also be stored in the computer-readable medium that can guide computers, other programmable data processing apparatuses or other devices to operate in a specific manner, so that the instructions stored in the computer-readable medium generate articles including instructions that implement the functions/actions specified in the flowcharts and/or block diagrams or blocks.

The computer program instructions may also be loaded on the computer, other programmable data processing apparatuses or other devices to perform a series of operable steps on the computer, other programmable apparatuses or other devices to produce a computer-implemented process, such that the instructions executed on the computer or other programmable apparatuses provide processes for implementing the functions/actions specified in the flowcharts and/or block diagram blocks or blocks.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the descriptions are considered as examples only, with a true scope being indicated by the following claims and their full scope of equivalents.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the present disclosure. This should not be interpreted as intending that an unclaimed disclosed feature is essential to any claim. Rather, inventive subject matter may lie in less than all features of a disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A training method for training a learning network for medical image analysis, comprising:
   when a pre-trained learning network trained using an original training data set has an evaluation defect, performing, by a processor, a data augmentation on the original training data set for the evaluation defect to obtain a data augmented training data set; and
   performing, by the processor, a refined training on the pre-trained learning network using the data augmented training data set,
   wherein the refined training is performed in N stages with N being a positive integer, and when N is greater than 1, an Nth stage of the refined training comprises:
   performing a data augmentation on a (N−1)th training data set for a Nth evaluation defect to obtain a Nth training data set; and
   performing the Nth stage of the refined training on a (N−1)th learning network using the Nth training data set to obtain an Nth learning network.

2. The training method according to claim 1, wherein the pre-trained learning network has at least two evaluation defects, wherein the data augmentation is performed on the original training data set and the refined training on the pre-trained learning network using the data augmented training data set is performed in the N stages sequentially, each stage corresponding to an evaluation defect of the at least two evaluation defects.

3. The training method according to claim 2, wherein the Nth learning network obtained through the Nth stage of the refined training eliminates evaluation defects targeted by a first stage of the refined training through the Nth stage of the refined training.

4. The training method according to claim 3, wherein, further comprising:
   evaluating the Nth learning network obtained through the Nth stage of the refined training to determine whether an evaluation defect from the at least two evaluation defects still exists.

5. The training method according to claim 4, further comprising:
   identifying, according to an evaluation result of the Nth stage of the refined training, a subset of training data associated with the evaluation defect targeted by a (N+1)th stage of the refined training from the training data set used in the Nth stage of the refined training; and
   performing a data augmentation on the identified training data set and adding the augmented training data to the training data set.

6. The training method according to claim 4, further comprising:
   acquiring additional original training data according to an evaluation result of the Nth stage of the refined training and identifying a subset of training data associated with an evaluation defect targeted by a (N+1)th stage of the refined training from the original training data; and
   performing a data augmentation on the identified original training data and adding the augmented training data into a training data set used in the Nth stage of the refined training.

7. The training method according to claim 2, wherein performing the data augmentation and the refined training in the N stages further comprises:
   performing a first data augmentation on the original training data set for a first evaluation defect of the at least two evaluation defects to obtain a first training data set;
   performing a first stage of the refined training on the pre-trained learning network using the first training data set to obtain a first learning network;
   performing a second data augmentation on the first training data set for a second evaluation defect of the at least two evaluation defects to obtain a second training data set; and
   performing a second stage of the refined training on the first learning network using the second training data set to obtain a second learning network.

8. The training method according to claim 2, wherein the at least two evaluation defects have different importance, wherein an evaluation defect targeted by an earlier stage of the refined training is more important than that targeted by a later stage.

9. The training method according to claim 8, wherein an evaluation defect in which a missed detection rate is given priority over a false positive rate is targeted by a training stage before a training stage targeting an evaluation defect in which the false positive rate is given priority over the missed detection rate.

10. The training method according to claim 2, wherein when the evaluation defect is associated with an imbalance in detection rates of target objects at different positions or with different attributes, performing the data augmentation on the original training data further comprises:
    performing more sampling and augmentation on a subset of training data in the original training data corresponding to a target object with a lower detection rate.

11. The training method according to claim 2, wherein each stage of the refined training uses a same loss function.

12. The training method according to claim 1, wherein a medical image is a blood vessel related image, the medical image analysis comprises segmentation of a target artery, and the evaluation defect comprises a blood vessel branch fracture, a vein mixing in artery, an uneven segmentation at plaque or a low recognition rate of an implant.

13. The training method according to claim 1, wherein a medical image is a lung related image, the medical image analysis comprises a lung nodule detection, and the evaluation defect comprises a detection rate of ground glass nodules being lower than that of solid nodules or a detection rate of nodules closer to a tissue being lower than that of nodules far away from the tissue.

14. The training method according to claim 1, further comprising:
acquiring the original training data set for the learning network with a predetermined structure;
performing, by the processor, a pre-training on the learning network using the original training data set to obtain the pre-trained learning network; and
evaluating, by the processor, the pre-trained learning network to determine whether the pre-trained learning network has the evaluation defect.

15. A training system for training a learning network for medical image analysis, comprising:
a communication interface configured to receive an original training data set; and
a processor configured to:
when a pre-trained learning network trained using the original straining data set has an evaluation defect, perform a data augmentation on the original training data set for the evaluation defect to obtain a data augmented training data set; and
perform a refined training on the pre-trained learning network using the data augmented training data set,
wherein the refined training is performed in N stages with N being a positive integer, and when N is greater than 1, to perform an Nth stage of the refined training, the processor is further configured to:
perform a data augmentation on a (N−1)th training data set for a Nth evaluation defect to obtain a Nth training data set; and
perform the Nth stage of the refined training on a (N−1)th learning network using the Nth training data set to obtain an Nth learning network.

16. The training system according to claim 15, wherein the pre-trained learning network has at least two evaluation defects, and the processor is further configured to perform the data augmentation on the original training data set and perform the refined training on the pre-trained learning network using the data augmented training data set in the N stages sequentially, each stage corresponding to an evaluation defect of the at least two evaluation defects.

17. The training system according to claim 16, wherein the Nth learning network obtained through the Nth stage of the refined training eliminates evaluation defects targeted by a first stage of the refined training through the Nth stage of the refined training, wherein the processor is further configured to evaluate the Nth learning network obtained through the Nth stage of the refined training to determine whether an evaluation defect from the at least two evaluation defects still exists.

18. The training system according to claim 16, wherein the at least two evaluation defects have different importances, wherein an evaluation defect targeted by an earlier stage of the refined training is more important than that targeted by a later stage.

19. The training system according to claim 15, wherein the processor is further configured to:
perform a pre-training on the learning network with a predetermined structure using the original training data set to obtain the pre-trained learning network; and
evaluate the pre-trained learning network to determine whether the pre-trained learning network has the evaluation defect.

20. A non-transitory computer-readable storage medium on which computer program instructions are stored, wherein the computer program instructions are executed by a processor to a training method for training a learning network for medical image analysis, the training method comprising:
when a pre-trained learning network trained using an original data set has an evaluation defect, performing a data augmentation on the original training data set for the evaluation defect to obtain a data augmented training data set; and
performing a refined training on the pre-trained learning network using the data augmented training data set,
wherein the refined training is performed in N stages with N being a positive integer, and when N is greater than 1, an Nth stage of the refined training comprises:
performing a data augmentation on a (N−1)th training data set for a Nth evaluation defect to obtain a Nth training data set; and
performing the Nth stage of the refined training on a (N−1)th learning network using the Nth training data set to obtain an Nth learning network.

* * * * *